(12) United States Patent
Elaasar et al.

(10) Patent No.: US 8,386,997 B2
(45) Date of Patent: Feb. 26, 2013

(54) UML PROFILE TRANSFORMATION AUTHORING METHOD AND SYSTEM

(75) Inventors: Maged E. Elaasar, Kanata (CA); Jeffrey M. Fischer, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 1147 days.

(21) Appl. No.: 11/951,075

(22) Filed: Dec. 5, 2007

(65) Prior Publication Data
US 2009/0150856 A1 Jun. 11, 2009

(51) Int. Cl.
*G06F 9/44* (2006.01)
(52) U.S. Cl. ........................................ 717/104
(58) Field of Classification Search .................. 717/104
See application file for complete search history.

(56) References Cited

U.S. PATENT DOCUMENTS

2004/0025110 A1* 2/2004 Hu ............................... 715/500
2006/0117037 A1* 6/2006 Gutz et al. ..................... 707/100
2007/0180424 A1* 8/2007 Kazakov et al. .............. 717/104

OTHER PUBLICATIONS

Budinsky, Frank; Steinberg, David; Merks, Ed; Ellersick, Raymond; Grose, Timothy, eclipse Modeling Framework, 2004, pp. 293-295 and 298-300.*

Czarnecki, K., et al., "Feature-Based Survey of Model Transformation Approaches," *IBM Systems Journal*, vol. 45(3): pp. 612-646, (2006).
IBM Rational Software Architect Version 7.0. http://www-1.ibm.com/support/docview.wss?rs=2044&uid=swg24013690, Release Date (product released Dec. 5, 2006).
Swithinbank, M., et al., "Patterns: Model-Driven Development Using IBM Rational Software Architect (Section 9.5.2)", *IBM Redbooks*. http://www.redbooks.ibm.com/redbooks/pdfs/sg247105.pdf.

* cited by examiner

*Primary Examiner* — Li B Zhen
*Assistant Examiner* — Bradford Wheaton
(74) *Attorney, Agent, or Firm* — Hamilton, Brook, Smith & Reynolds, P.C.

(57) ABSTRACT

A method and apparatus for authoring model-to-model transformations of programming models involving profiles is disclosed. Using a declarative mapping between a given profile of a subject programming model and a target profile of a target programming model, transformation of the given profile is specified and results in a declarative specification. Similarly the declarative mapping may be to a profile of a target programming model (without a corresponding source side profile) or from a profile of a source programming model (without a corresponding target side profile). Based on the declarative specification, a transformation code implementation (e.g. a transformation API) is generated. The given profile is specified as an input domain or as an output domain along with a meta model of the subject programming model. The generated transformation code implementation effectively handles complexities of dealing with the given profile at run time.

15 Claims, 8 Drawing Sheets

UML PROFILE TRANSFORMATION AUTHORING METHOD AND SYSTEM

BACKGROUND OF THE INVENTION

Model-driven architecture (MDA) is an approach to software development advocated by the Object Management Group (OMG). See A. Kleppe, J. Warmer and W. Bast, "MDA Explained: The Model Driven Architecture: Practice and Promise", Addison-Wesley, Boston, Mass., 2003. It provides a set of guidelines for structuring software specifications in the form of models. The approach suggests describing a software system's specifications using a platform independent model (PIM). A PIM is usually specified in a language defined using the Meta Object Facility (MOF), a standard by the OMG for describing modeling languages. A prominent example of such a language is the Unified Modeling Language (UML), a general purpose modeling language that is well adopted by the software engineering community. Alternatives to UML also exist and are collectively referred to as Domain Specific Languages (DSL), as they are more specialized and target certain domains. See M. Mernik, J. Heering, and A. M. Sloane, "When and How to Develop Domain-Specific Languages." ACM Computing Surveys, 37(4):316-344, 2005.

Once a software system has been specified using a PIM, a platform is then chosen to realize it using specific implementation technologies, producing what is referred to as a platform specific model (PSM). A PSM can be specified using several domain specific languages. The process of going from (translating) a PIM to a PSM is called model-to-model transformation and can usually be automated.

An alternative way to defining DSLs is through UML profiles. A UML Profile is a light-weight extensibility mechanism for UML. It contains a collection of stereotypes extending certain types from UML and adding properties to them. Unlike a heavy weight extension, which is done by extending the meta-model (an M2 level model), a profile is an M1-level extension. In this regard, extending M2 using M1 constructs, a profile is unique and presents interesting challenges to tool developers and users.

The challenge for modeling tool is to allow users to work seamlessly with profiles and MOF-based DSLs. One kind of tool where this challenge presents itself is model to model transformation tools. A typical requirement here is to develop transformations from UML models with certain applied profiles to UML models with different applied profiles. Alternatively, the transformations could be from UML models with applied profiles to other MOF-based DSLs, or vice versa. For example transformations see: OMG, MOF QVT Final Adopted Specification, *OMG Document ptc*/05-11-01; P. Swithinbank, M. Chessell, T. Gardner, C. Griffin, J. Man, H. Wylie and L. Yusuf, "Patterns: Model-Driven Development Using IBM Rational Software Architect (Section 9.5.2)," *IBM Redbooks* at redbooks.ibm.com; R. Popma "JET Tutorial," at articles at eclipse.org; C. Griffin "IBM Model Transformation Framework 1.0.0: Programmer's Guide. 2004," at alphaworks.ibm.com; Fujaba Tool Suite 4, University of Paderborn Software Engineering, www.fujaba.de; G. Taentzer "AGG: A Graph Transformation Environment for Modeling and Validation of Software." *Application of Graph Transformations with Industrial Relevance (AGTIVE* '03) 3062, pp. 446-453 (2003). These and most transformation approaches today, either do not attempt to solve this problem or leave it to the user to deal with it. However, given the fact that profile implementations are almost always different from those of DSLs, users are faced with steep learning curves and a lot of complexities coming from dealing with two different meta-level constructs.

SUMMARY OF THE INVENTION

The present invention addresses the short comings and foregoing problems of the prior art. The main idea of the invention is to specify transformations involving UML profiles declaratively using meta-model mapping, in a consistent way to regular DSL mapping, then use a transformation from that specification to generate an imperative transformation implementation that hides the complexity of dealing with profiles at runtime. The approach is implemented as an extension to the Model Transformation Authoring Framework (MTAF) by allowing profiles to be specified as an input and/or output domain along with the UML2 meta-model. Further details on MTAF are described in U.S. patent application Ser. No. 11/950,926 for "Computer Method and Apparatus for Providing Model to Model Transformation Using an MDA Approach" by assignee, as well as in IBM Rational Software Architect Version 7.0, both herein incorporated by reference.

Once a profile is specified as a domain, mappings can be created between hybrid types consisting of UML types stereotyped with one or more stereotypes from those profiles. The properties of those stereotypes, along with properties from the UML type, then become available for mapping in a similar way. Profiles can also contain types in addition to stereotypes. Those types can also be mapped in a similar way to DSL types.

All the basic mapping rules, provided by MTAF, are used without change in the declarative specification. However, the imperative implementations of those rules are extended to become aware of UML profiles. Since MTAF provides a transformation between the declarative specification and its implementation, the details can be hidden from the user satisfying the requirement described in the problem statement.

In one embodiment, a system and method for providing and/or authoring model-to-model transformation of programming models involving profiles, comprises the steps of:

using a declarative mapping between domains that can have one or more profiles applied on a source side and/or a target side, specifying transformation of profiles and resulting in a declarative specification; and generating a transformation code implementation based on the declarative specification including allowing a given profile to be specified as an input domain or as an output domain along with a meta model of a subject programming model. The generated transformation code implementation effectively handles complexities of dealing with the given profile at run time. The generated transformation code implementation is provided as a MTAF API.

In some embodiments, the declarative specification further forms hybrid types from types in the target side and stereotypes from one or more profiles; and the declarative specification creates mappings from/to those hybrid types on the fly including the properties of both the mapped type and the stereotypes.

With the present invention, a profile can be on the source side or target side of a transformation mapping process. It is not a requirement to have profiles on both sides (i.e., the invention is not limited to profile-to-profile mapping) but is flexible enough that a profile can be specified along with the UML metamodel if the profile is specified as source and/or target of a mapping.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
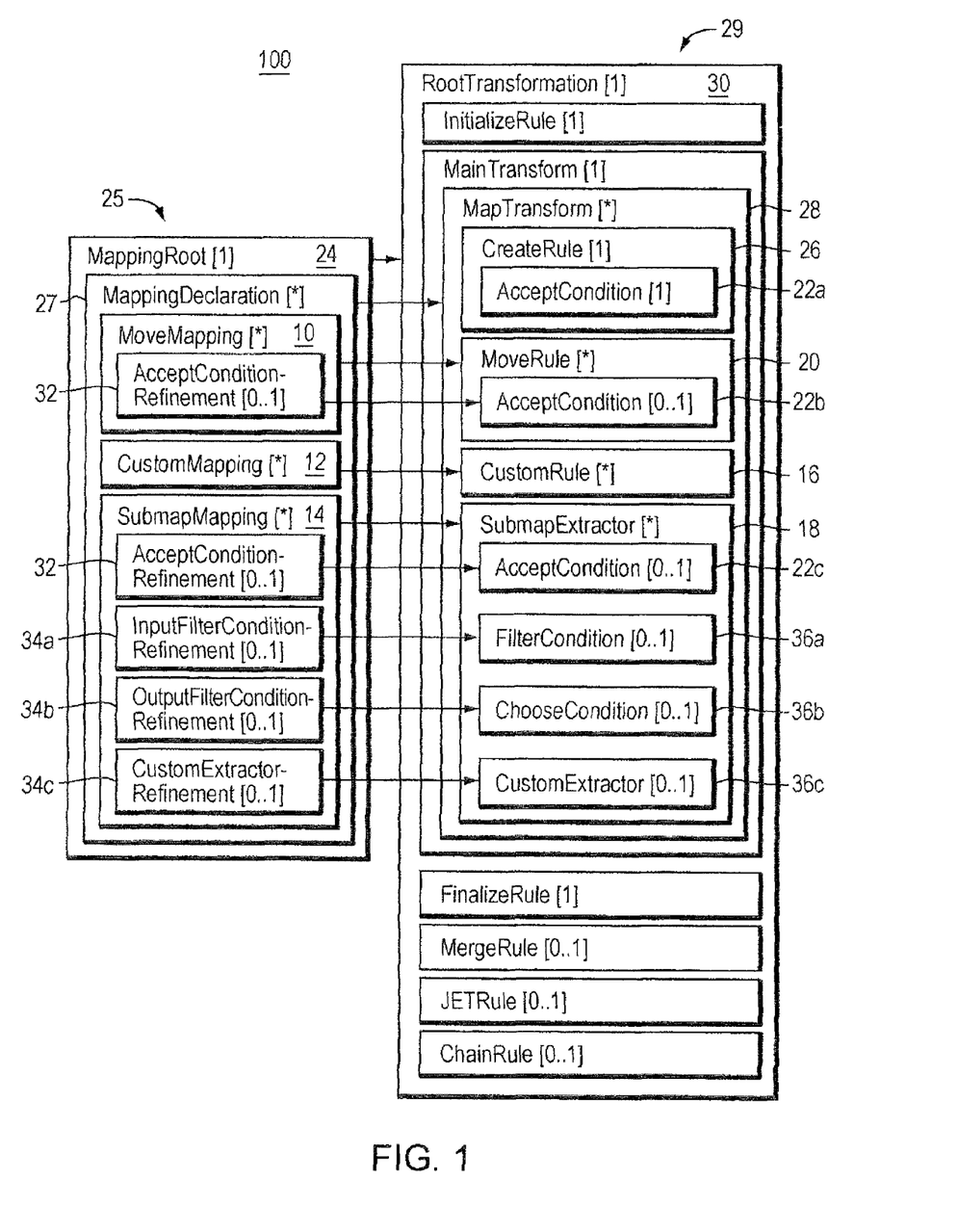
FIG. 1 is a schematic illustration of a declarative mapping from a domain specific language model (input domain meta model) to a transformation API (output domain meta model) in accordance with the present invention.

In a preferred embodiment, applicants use the MTAF framework to provide the ability to author transformations between input and output Ecore-based DSLs. Ecore-based DLSs are further detailed in F. Budinsky, D. Steinberg, T. Grose, S. Brodsky and E. Merks, "Eclipse Modeling Framework", Pearson Education, August 2003, herein incorporated by reference. More generally, the first step in the invention authoring process is to map the input domain meta-model and the output domain meta-model DSLs using a declarative mapping DSL 27. One such declarative mapping DSL 27 is provided by MTAF as illustrated in FIG. 1. The result of the first step is a mapping model (transformation specification) 25 that specifies how the input domain DSLs relate to the output domain DSLs.

The second step in the invention authoring process is to generate an imperative transformation implementation using a framework API provided by MTAF. The mapping between the formed transformation specification 25 and the corresponding code implementation (transformation API 29), shown in FIG. 1, is implemented as a JET (JAVA Emitter Template) model-to-text transform in one embodiment.

In particular the mapping root 24 translates and corresponds to a RootTransformation 30. The mapping declaration 27 translates to a MapTransform 28 construct in the transformation API 29. That is, move mapping 10, CustomMapping 12 and SubmapMapping 14 elements of the MappingDeclaration 27 correspond to a MoveRule 20, CustomRule 16 and SubmapExtractor 18 respectively of the transformation API 29. Similar correspondence of Subelements of these elements and other correspondences are further discussed below.

Figure 2:
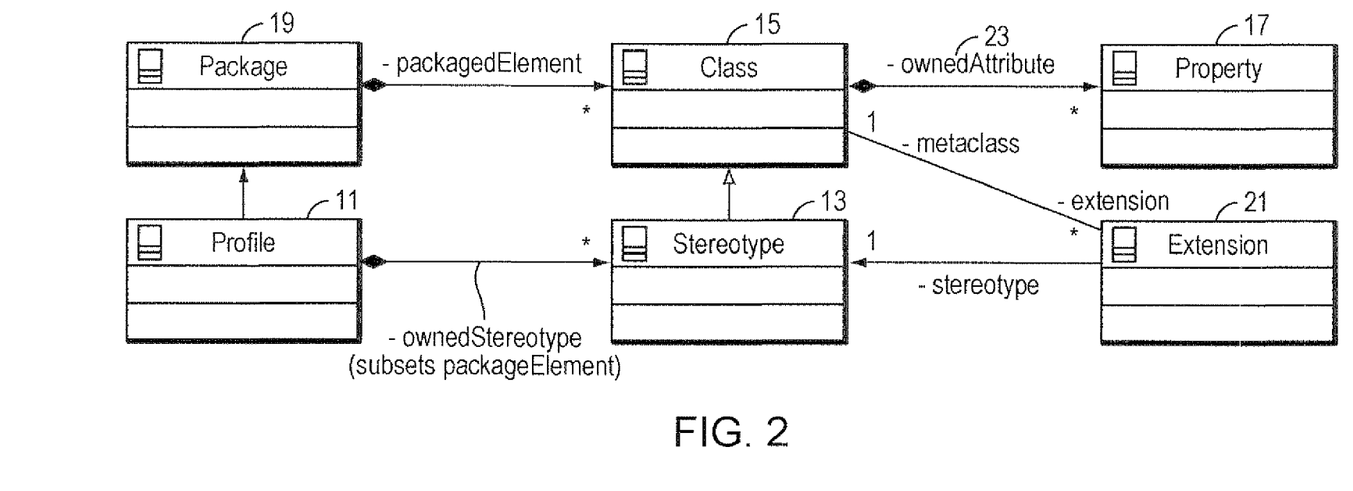
FIG. 2 is a block diagram of the UML2 profile semantics.

The present invention extends the MTAF to support the transformation to/from UML profiles whose semantics are shown in FIG. 2. By way of background the modeling architecture for UML2 can be viewed using a four layer metamodel hierarchy. These layers provide for the meta-metamodel (e.g. infrastructure library), the metamodel (UML2), the user model (the model defined in the user's problem domain), and the application layer (the layer of user code that exploits the model they have defined). For reference, the following Table 1 outlines the four level meta-model hierarchy, including a description of each level and an example of the information found at each level:

TABLE 1

Four-Level Metamodel Hierarchy

| Level | Description | Examples |
|---|---|---|
| M3 | Meta-metamodel<br>Applicants solution uses ECore but there are other frameworks as well.<br>The model used to define meta-models<br>Forms the foundation of the metamodeling hierarchy providing the basic work units for the meta model. | Instances of ECore<br>EPackage, EClass,<br>EAttribute, EReference |
| M2 | UML 2 meta-model<br>Every element in the meta-model is an instance of an element in the meta-metamodel.<br>Defines a language for specifying models | Instances of ECore<br>Package, Class, Property,<br>Association |
| M1 | User model<br>An instance of the metamodel.<br>allows users to define their problem domain | Instances of UML2 elements<br>MyClass, Date, etc. |
| M0 | Run-time instances<br>contains run-time instances of model elements | Instances of User model<br>myClass, date, etc. |

In general, a UML "profile" is a type of package 19 and is formed of (or has) a collection of stereotypes 13. A stereotype 13 is a type of class 15 (in the object oriented programming sense) and has zero or more properties 17. A typical example UML2 profile contains a stereotype that extends a metaclass. Illustrated in FIG. 2 is an example Profile 11 consisting of a stereotype extension 13 to the UML2 metaclass "Class" 15. The illustrated stereotype "Stereotype" 13 adds new properties (generally 17) to the metaclass "Class" 15.

In terms of how the UML2 models this example, the diagram shown in FIG. 2 details the semantic structure of the stereotype definition. Stereotype 13 is diagrammed as an extension 21 and as having "owned" attributes 23. Although the stereotype 13 is at the M1 level (see Table 1), it is diagrammed as extending M2 classes.

Returning to the present invention, first, the extensions related to the declarative mapping DSL 25 are discussed. Basically, one or more UML Profiles 11 are allowed to be input domains or output domains to a MappingRoot 24 (FIG. 1). However, since a profile 11 is an extension to the UML meta-model, that meta-model has to also be specified as a domain in the same side as the Profile 11.

Once a profile 11 is specified as a domain, the profile is converted on-the-fly from an M1 instance to an M2 instance using a UML->Ecore transformation provided in UML2: EMF-based UML 2.0 Metamodel Implementation at eclipse.org. The resulting Ecore model 29 representing the profile 11 is used instead by the mapping editor in the declarative specification 25. The details are discussed next.

Figure 3:
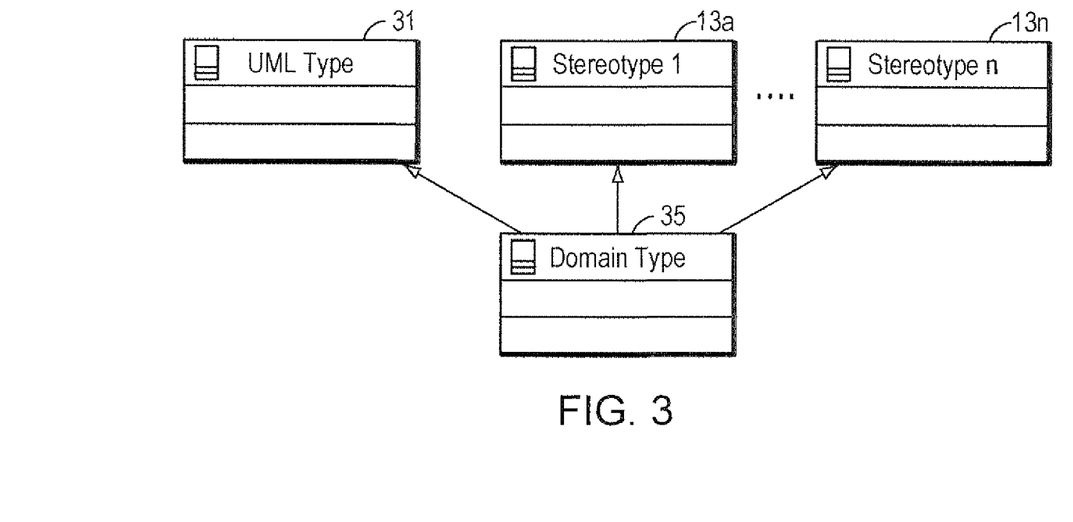
FIG. 3 is a block diagram of a new domain type extending the UML type and stereotypes according to principles of the present invention.

Profiles 11 have a collection of Classes 15 and Stereotypes 13, which are allowed to be input domains and output domains of MappingDeclarations 27. While a profile Class 15 can directly be an input domain or an output domain of a MappingDeclaration 27, a profile Stereotype 13 can be specified as a domain only if a type (from UML) that is extended by this Stereotype 13 is also specified as a domain in the same side. One or more applicable stereotypes 13 (from the same or different profiles 11) can be specified at the same time for the same type as a domain. In this case, a new M2 type is created on the fly to represent this domain. The new type multi-inherits both the UML type 31 and all the stereotypes 13a, . . . n (in their M2 representation). FIG. 3 shows the new resulting domain type 35.

The subject Profile Classes 15 and Stereotypes 13 have attributes of type Property 17, which get converted to EStructuralFeatures. These features are allowed to be input domains and output domains for the various kinds of mappings that can be nested in a MappingDeclaration 27 in a similar way to regular EStructuralFeatures coming from a type in a DSL. In case of a domain with stereotypes 13, the newly created domain type 35 multi-inherits all the features coming from the base UML type 31 and all the stereotypes 13, exposing the stereotype's properties 17 for mapping.

The present invention second extension to MTAF, related to UML profiles 11, include specific extensions to the provided imperative transformation API 29. For example, a special subtype of the 'accept' Condition 22 for MapTransform 28 rules 16, 18, 20, 26 is provided to additionally check for applied stereotypes on UML elements if the input domains of the transform include stereotypes 13. An input mapping element 10, 12, 14 passes the condition 32 only if all the input domain stereotypes 13 are applied to it. Also, a special subtype of CreateRule 26 is provided to apply stereotypes 13 to the created UML elements if the output domains include those stereotypes. If the output domain contains instead a profile-defined type, the rule also knows how to create instances of that type. Finally, special subtypes of MoveRule 20 and SubmapExtractor 18 are provided to provide access to corresponding/respective profile-defined input and output domain properties (mapped from condition refinements 34a, b, c to conditions 36a, b, c) namely a stereotype's properties and a profile type's properties.

EXEMPLIFICATION

Figure 4:
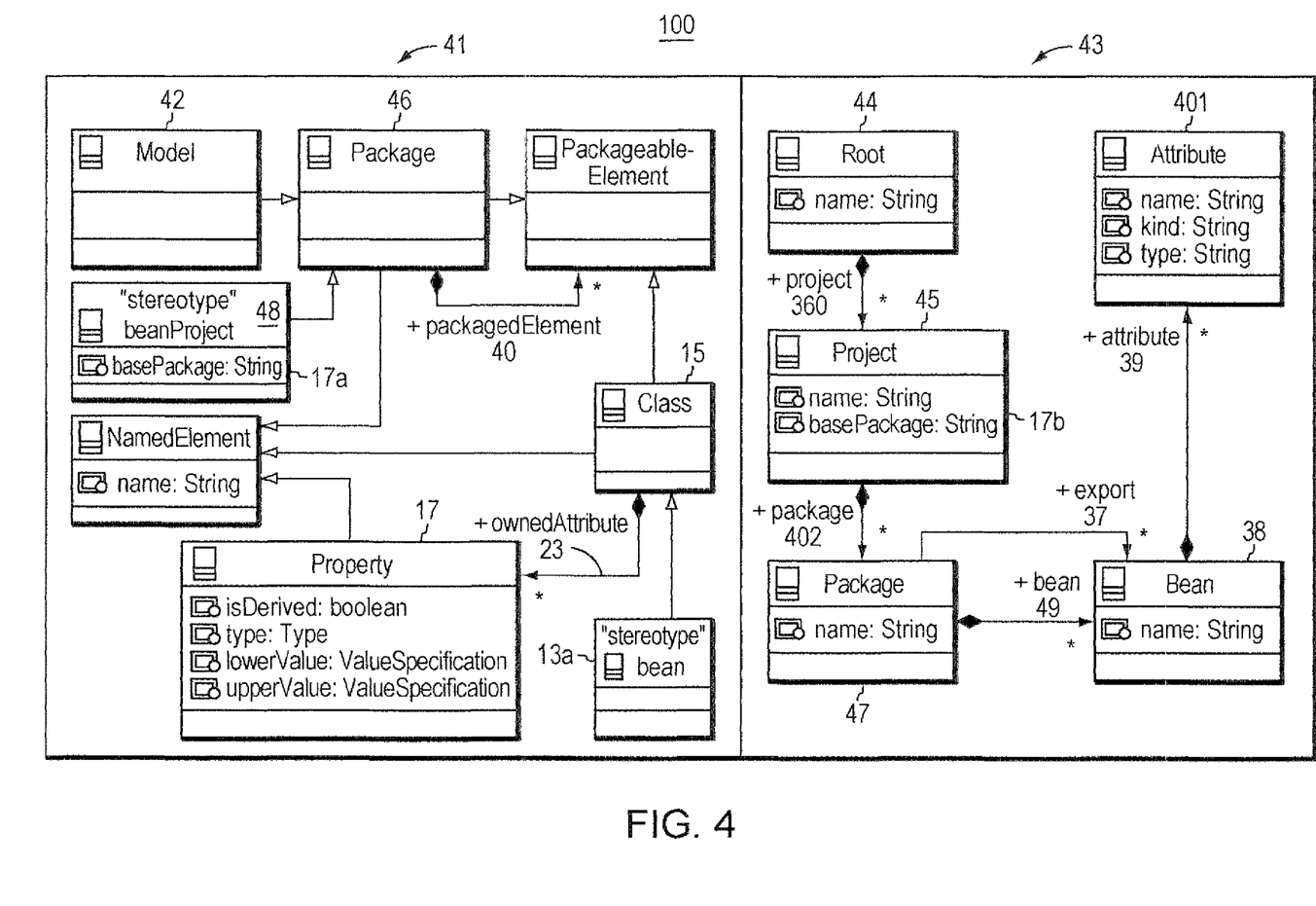
FIG. 4 is a schematic view of an input domain meta model and output domain meta model in an example of the present invention.

The example of FIG. 4 demonstrates a typical transformation mapping between a high level DSL (UML2+Bean Profile), used to capture a design, and a low level DSL (BeanCodeGenerator) used for java beans code generation. This example illustrates the present invention 100 features using the tooling provided by MTAF to specify a model to model transformation involving profiles.

Figure 5:
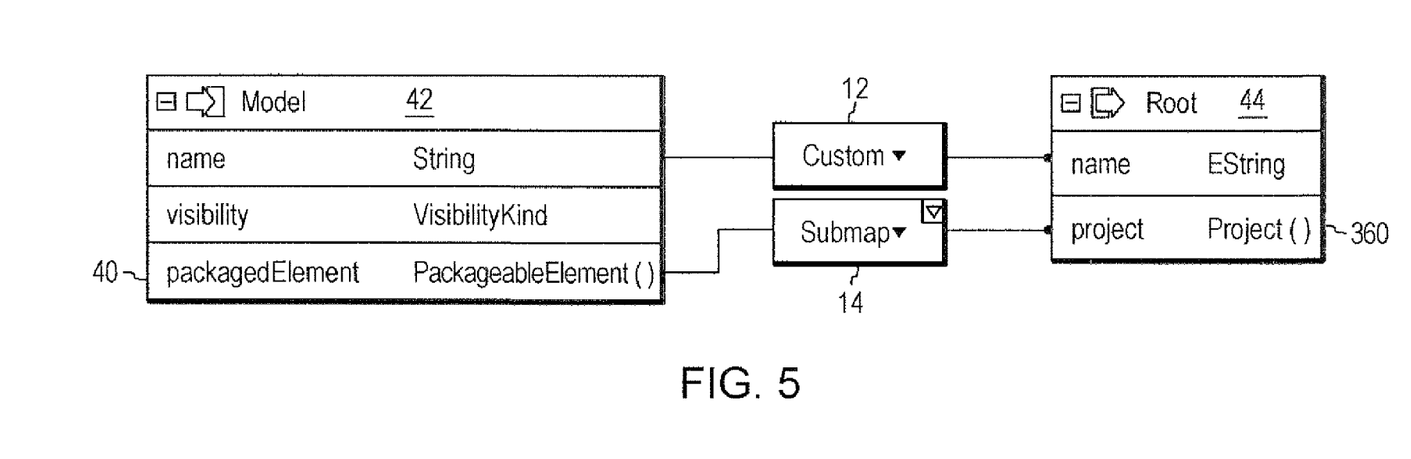
FIG. 5 is a block diagram of a ModelToRoot mapping declaration in an embodiment of the present invention.

MTAF provides an Eclipse-based mapping editor that allows for choosing the input and output DSLs as domains of a MappingRoot 24. In the example, the input DSLs (input domain meta models) 41 are UML2+Bean Profile, generally at 42, 13a, 15, 17 while the output DSL (output domain meta model) 43 is BeanCodeGenerator. Five declarations are then identified:

ModelToRoot. This mapping, shown in FIG. 5, is from Model EClass 42 of UML2 to Root EClass 44 of BeanCodeGenerator. The input domain meta model name is mapped to the output domain meta model name using a CustomMapping 12 with the custom Java code: 'Root_tgt.setName("Beans"+ Model_src.getName( ));'. Also, the input's packagedElement 40 is mapped to the output's project 360 using a SubmapMapping 14 with reference to the 'PackageToProject' declaration of FIG. 6.

Figure 6:
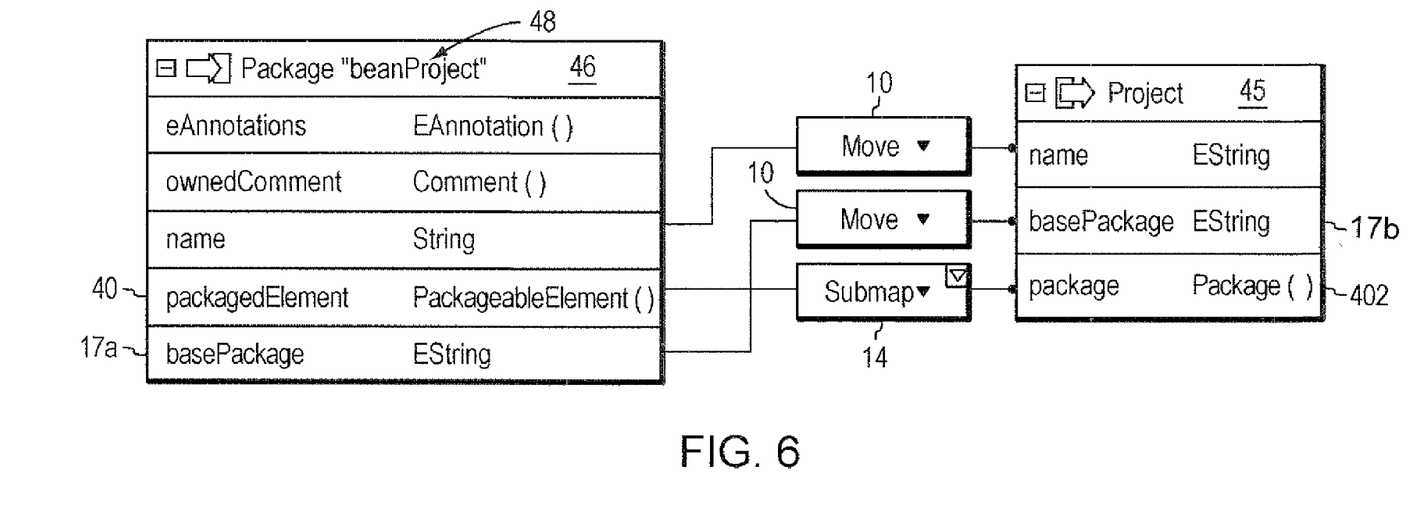
FIG. 6 is a block diagram of a PackageToProject mapping declaration in an embodiment of the present invention.

PackageToProject. This mapping, shown in FIG. 6, is from Package EClass 46 of UML2, with the beanproject Stereotype 48, to Project EClass 45 of BeanCodeGenerator. The input's name is mapped to the output's name using a MoveMapping 10. The input's basepackage 17a (a stereotype property) is mapped to the output's basepackage 17b using a MoveMapping 10. Finally, the input's packagedElement 40 is mapped to the output's package 402 using a SubmapMapping 14 with reference to the 'PackageToPackage' declaration of FIG. 7.

Figure 7:
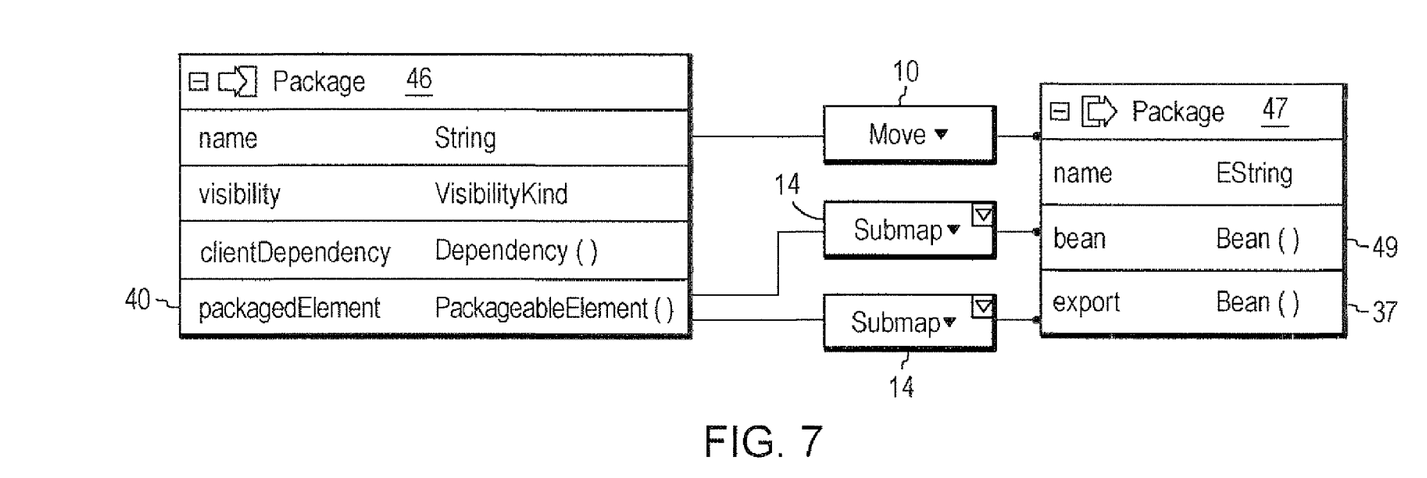
FIG. 7 is a block diagram of a PackageToPackage mapping declaration in an embodiment of the present invention.
Figure 8:
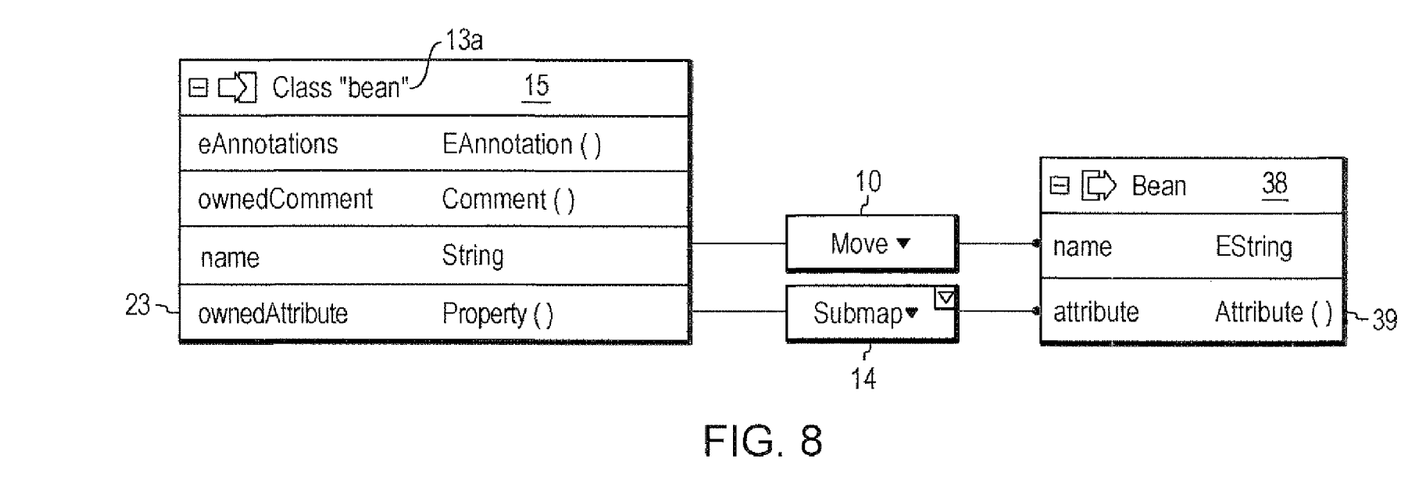
FIG. 8 is a block diagram of the ClassToBean mapping declaration in an embodiment of the present invention.

PackageToPackage. This mapping, shown in FIG. 7, is from Package EClass 46 of UML2 to Package EClass 47 of BeanCodeGenerator. The input's name is mapped to the output's name using a MoveMapping 10. The input's packagedElement 40 is mapped to the output's bean 49 using a SubmapMapping 14 with reference to the 'ClassToBean' declaration (FIG. 8). Also, the input's packagedElement 40 is mapped to the output's export 37 using a SubmapMapping 14 with reference to the 'ClassToBean' declaration. However, this last mapping has the following refinements 34: an 'accept' Condition 22 with the OCL expression 'Package_src.visibility=Visibility.Public', an 'inputFilter' 36a with the OCL expression 'packagedElement_src.visibility=Visibility. Public', and an 'outputFilter' 36b with the Java code 'return !export_tgt.get Attribue( ).isEmpty( );'.

ClassToBean. This mapping, shown in FIG. 8, is from Class EClass 15 of UML2, with the bean Stereotype 13a, to Bean EClass 38 of BeanCodeGenerator. The input's name is mapped to the output's name using a MoveMapping 10. The input's ownedAttribute 23 is mapped to the output's attribute 39 using a SubmapMapping 14 with reference to the 'PropertyToAttribute' declaration of FIG. 9. The last mapping has a custom 'extractor' 36c with Java code 'return Utils.getAllAttributes(Class_src);'.

Figure 9:
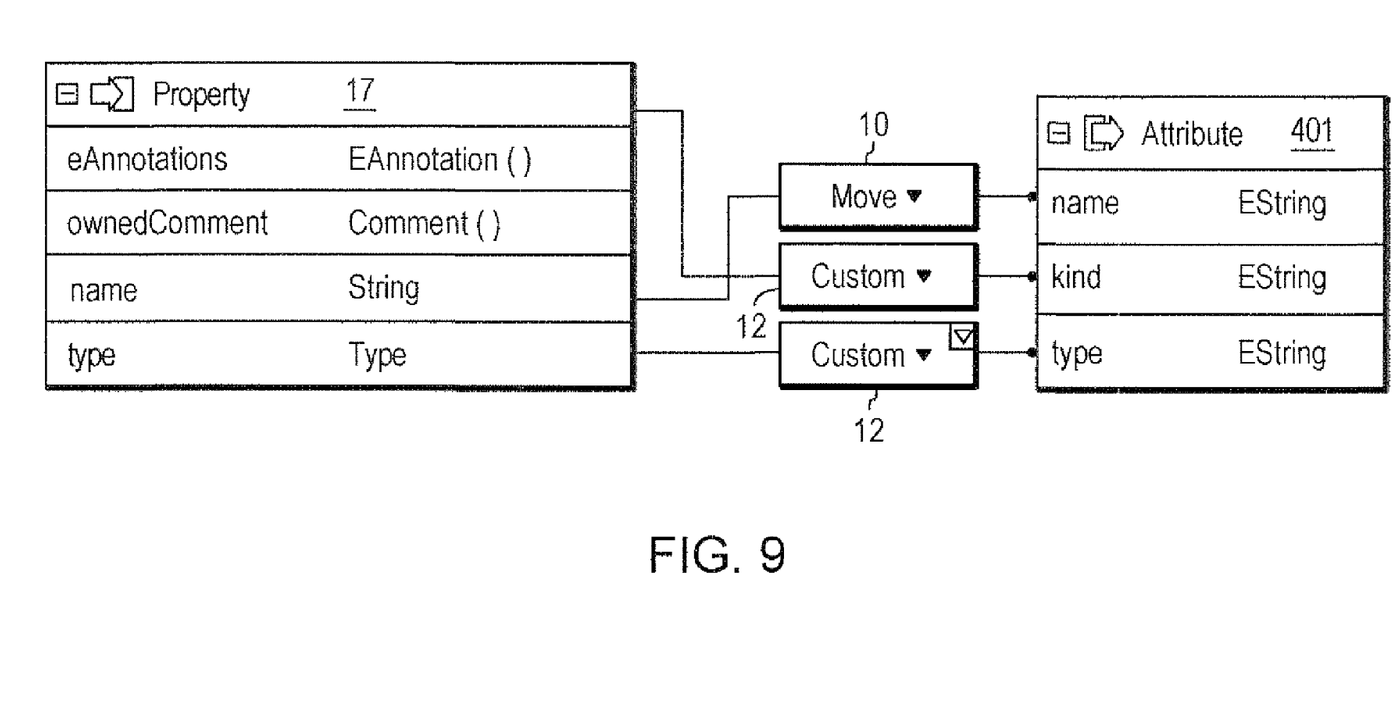
FIG. 9 is a block diagram of a PropertyToAttribute mapping declaration in an embodiment of the present invention.

PropertyToAttribute. This mapping, shown in FIG. 9, is from Property EClass 17 of UML2 to Attribute EClass 401 of BeanCodeGenerator. The input's name is mapped to the output's name using a MoveMapping 10. The input EClass is mapped to the output's kind using a CustomMapping 12 with the custom Java code: 'Attribute_tgt.setKind (Property_src.getUpper( )>1||Property_src.getUpp er( )==−1)?"LIST": "FIELD");'. The input type is mapped to the output's type using a CustomMapping 12 with the custom Java code: 'Attribute_tgt.setType (Property_src. getType( ).getName( ));'.

Figure 10:
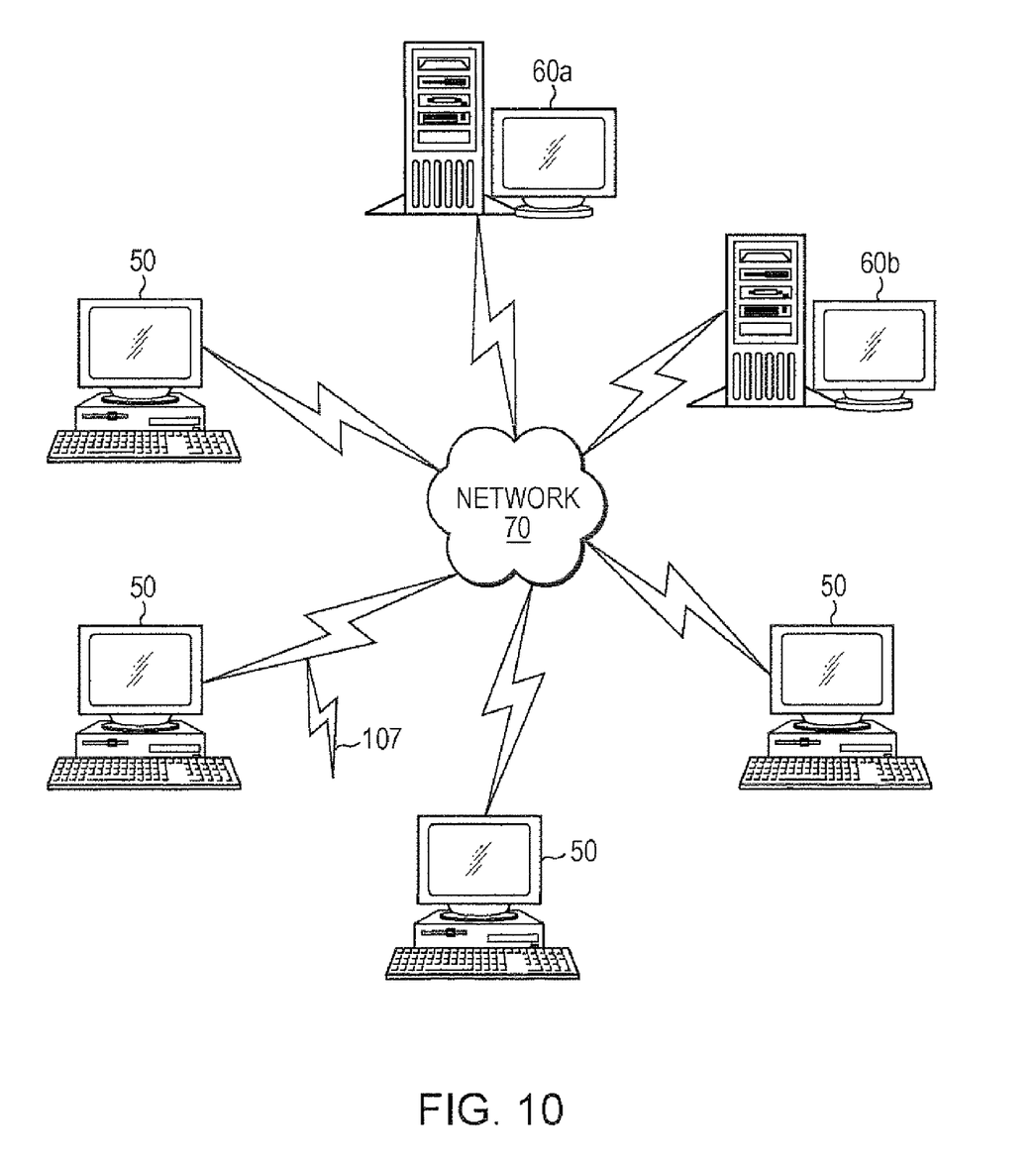
FIG. 10 is a schematic view of a computer network environment in which embodiments of the present invention are implemented.

FIG. 10 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
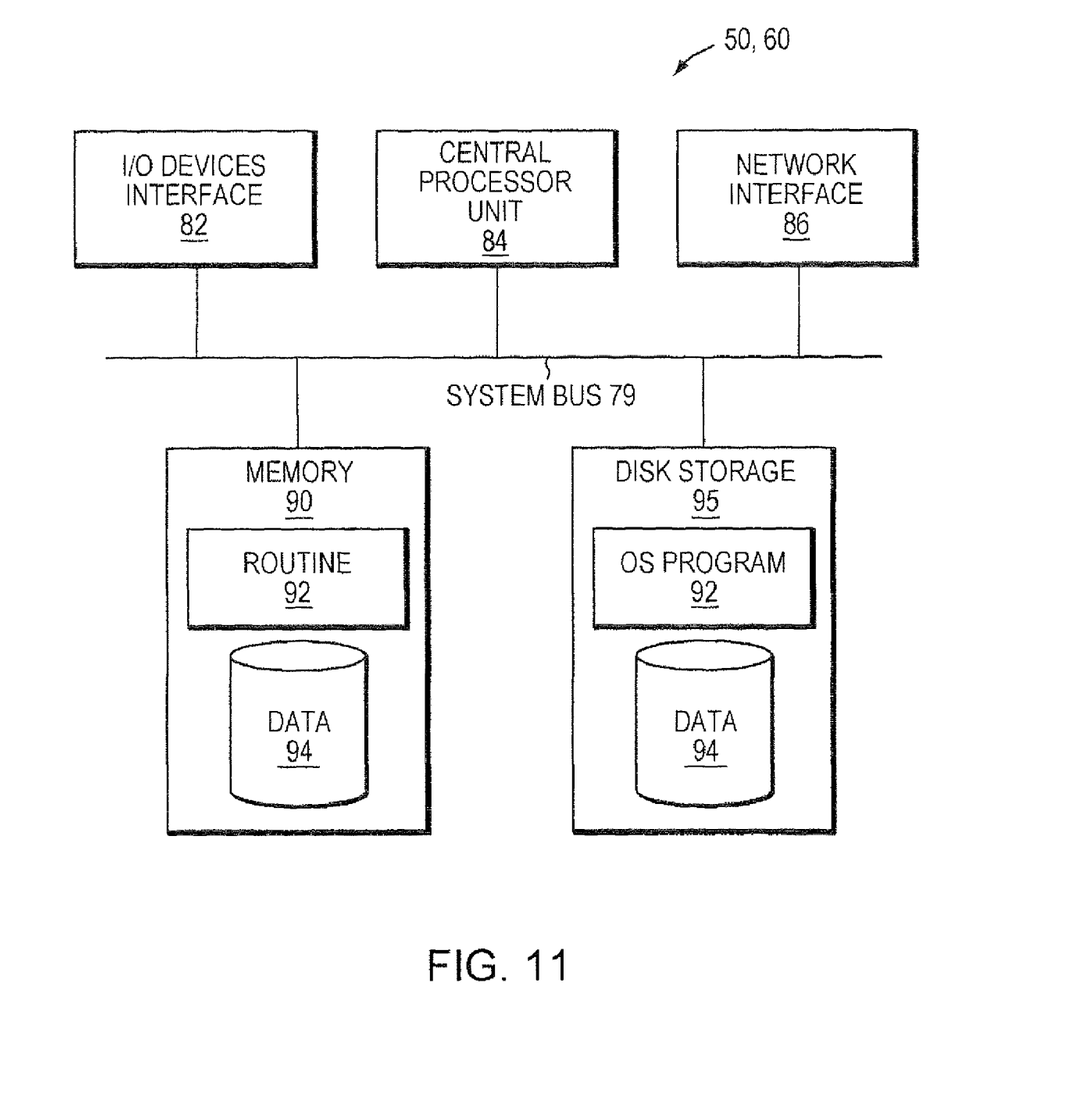
FIG. 11 is a block diagram of a computer node in the computer network of FIG. 10.

FIG. 11 is a diagram of the internal structure of a computer (e.g., client processor 50 or server computers 60) in the computer system of FIG. 10. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 10). Memory 90 provides volatile storage for computer software instructions 92 and data 94 used to implement an embodiment of the present invention (e.g., transformation authoring system and tool 100, declarative mapping 27, mapping model/specification 25, transformation API 29 and supporting method/process detailed above in FIGS. 1-9). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagation medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 10 and 11 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

What is claimed is:

1. A computer method for model-to-model transformation of programming models involving Unified Modeling Language (UML) profiles, comprising the steps of:
    in a processor:
        producing a declarative mapping between a first domain and a second domain, wherein one of the first and second domains has one or more subject UML profiles applied on a source side and/or a target, different ones of the subject UML profiles containing respective UML type and stereotype;

using the declarative mapping, specifying transformation of the subject UML profiles between the first and second domains and specifying transformation of UML types between the first and second domains, including forming a hybrid type from a UML type in the target side and stereotypes from one or more of the subject UML profiles such that the formed hybrid type has UML types stereotyped with one or more stereotypes of said one or more subject UML profiles, and such that properties of said one or more stereotypes along with properties of the UML type in the target side are mappable between domains, said specifying transformation of the subject UML profiles resulting in a declarative specification; and generating a transformation code implementation based on the declarative specification including: (i) allowing a given UML profile to be specified as a transformation input domain or as a transformation output domain along with a meta model of a subject programming model, and (ii) upon the given UML profile being specified as said transformation input or output domain, creating, on the fly, mappings between hybrid types including mapping between respective stereotype properties and UML type properties of the respective domains of the given UML profile and the subject programming model, said generated transformation code implementation handling differences in meta-level constructs of the respective domains of the given UML profile and the subject programming model at run time.

2. A method as claimed in claim 1 wherein the subject programming model is a UML model or a MOF-based DSL model.

3. A method as claimed in claim 1 wherein the given profile may contain other types in addition to stereotypes.

4. A method as claimed in claim 3 wherein the declarative specification maps the other types to types of the target side or source side, opposite the given profile.

5. A method as claimed in claim 1 wherein the step of generating transformation code implementation employs a framework API provided by Model Transformation Authoring Framework (MTAF).

6. Computer apparatus for authoring model-to-model transformation of programming models having Unified Modeling Language (UML) profiles, comprising:

a declarative mapper executable by a processor and mapping between a first domain and a second domain, wherein one of said domains has one or more subject UML profiles applied on a source side or one or more subject UML profiles applied on a target side, different ones of the subject UML profiles containing respective UML type and stereotype, the declarative mapper specifying transformation of the subject UML profiles between the first and second domains and specifying transformation of UML types between the first and second domains, including forming a hybrid type from a UML type in the target side and stereotypes from one or more of the subject UML profiles, such that the formed hybrid type has UML types stereotyped with one or more stereotypes of said one or more subject UML profiles, and such that properties of said one or more stereotypes along with properties of the UML type in the target side are mappable between the domains, the declarative mapper specifying transformation of the UML profiles resulting in a declarative specification; and a transformation code implementation generated based on the declarative specification, including: (i) a given UML profile being specified as a transformation input domain or as a transformation output domain along with a meta model of a subject programming model, and (ii) upon the given UML profile being specified as said transformation input or output domain, creating, on the fly, mappings between hybrid types including mapping between respective stereotype properties and UML type properties of the respective domains of the given UML profile and the subject programming model, and wherein the transformation code implementation when executed by a processor handles differences in meta-level constructs of the respective domains of the given UML profile and the subject programming model at run time.

7. Computer apparatus as claimed in claim 6 wherein the subject programming model is a UML model or a MOF-based DSL model.

8. Computer apparatus as claimed in claim 6 wherein the given profile may contain other types in addition to stereotypes.

9. Computer apparatus as claimed in claim 8 wherein the declarative specification maps the other types to types of at least one of the target side and the source side.

10. Computer apparatus as claimed in claim 6 wherein the code implementation utilizes an MTAF API.

11. A computer system for transforming programming models having Unified Modeling Language (UML) profiles comprising:

mapping means for providing a declarative mapping between a first domain and a second domain, wherein one of the first and second domains has one or more subject UML profiles applied on a source side and/or a target side, different ones of the subject UML profiles containing respective UML type and stereotypes, the declarative mapping specifying transformation of the subject UML profiles between the first and second domains and specifying transformation of UML types between first and second domains, including forming a hybrid type from a UML type in the target side and stereotypes from one or more of the subject UML profiles, such that the formed hybrid type has UML types stereotyped with one or more stereotypes of said one or more subject UML profiles, and such that properties of said one or more stereotypes along with properties of the UML type in the target side are mappable between the domains, and code implementation means for generating a transformation code implementation based on the declarative mapping, including: (i) a given UML profile being specified as a transformation input domain or as a transformation output domain along with a meta model of a subject programming model, and (ii) upon the given UML profile being specified as said transformation input or output domain, creating, on the fly, mappings between hybrid types including mapping between respective stereotype properties and UML type properties of the respective domains of the given UML profile and the subject programming model, and wherein the generated transformation code implementation when executed by a processor handles differences in meta-level constructs of the respective domains of the given UML profile and the subject programming model at run time.

12. A computer system as claimed in claim 11 wherein the subject programming model is a UML model or a MOF-based DSL model, and the meta model of the subject programming model is a UML2 meta model.

13. A computer system as claimed in claim 11 wherein the given profile contains other types in addition to stereotypes, and the declarative mapping maps the other types to types of the target side or source side.

14. A computer system as claimed in claim 11 wherein the code implementation means utilizes an API means.

15. A computer program product comprising:
   a non-transitent computer readable storage medium having a computer readable program, wherein the computer readable program when executed on a computer causes:
   using a declarative mapping between a first domain and a second domain, wherein at least one of the domains has one or more subject UML profiles applied on a source side and/or a target side, different ones of the subject UML profiles containing respective UML type and stereotypes, specifying transformation of the subject UML profiles and the UML types between the first and second domains resulting in a declarative specification, said specifying of the transformation including forming a hybrid type from a UML type in the target side and stereotypes from one or more of the subject UML profiles, such that properties of said stereotypes from the one or more subject UML profiles along with properties of said UML type in the target side are mappable between the domains, and
   generating a transformation code implementation based on the declarative specification including: (i) allowing a given UML profile to be specified as a transformation input domain or as a transformation output domain along with a meta model of a subject programming model, and (ii) upon the given UML profile being specified as said transformation input or output domain, creating, on the fly, mappings between hybrid types including mapping between respective stereotype properties and UML type properties of the respective domains of the given UML profile and the subject programming model, wherein said transformation code implementation when executed by a processor handles differences in meta-level constructs of the respective domains of the given UML profile and subject programming model at run time.

\* \* \* \* \*